United States Patent [19]

Chang et al.

[11] Patent Number: 5,064,932
[45] Date of Patent: Nov. 12, 1991

[54] POLY(KETO-ESTERS)

[75] Inventors: Biau-Hung Chang, Wester Chester; Lester Y. Lee, Hamilton; Jack Kwiatek, Cincinnati, all of Ohio

[73] Assignee: Quantum Chemical Corporation, New York, N.Y.

[21] Appl. No.: 498,527

[22] Filed: Mar. 26, 1990

Related U.S. Application Data

[63] Continuation-in-part of Ser. No. 416,903, Oct. 4, 1989, Pat. No. 4,929,711.

[51] Int. Cl.$^5$ .................................................. C08G 2/32
[52] U.S. Cl. ..................... 528/220; 528/222; 528/392; 528/486; 528/491; 528/497; 528/503; 524/284; 524/290; 524/292; 524/315; 524/341; 525/191; 525/192; 525/220; 525/240
[58] Field of Search ............... 528/220, 222, 392, 486, 528/491, 497, 503; 524/290, 284, 292, 315, 341; 525/191, 192, 220, 240

[56] References Cited

U.S. PATENT DOCUMENTS

| | | | |
|---|---|---|---|
| 2,457,271 | 12/1948 | Pinkney | 525/419 |
| 2,457,279 | 12/1948 | Scott | 528/392 |
| 2,495,284 | 1/1950 | Pinkney | 525/539 |
| 2,495,286 | 1/1950 | Brubaker et al. | 528/392 |
| 3,780,140 | 12/1973 | Hammer | 525/185 |
| 4,137,382 | 1/1979 | Vetter, Jr. | 528/271 |
| 4,172,939 | 10/1979 | Hoh | 528/392 |
| 4,616,072 | 10/1986 | White | 525/539 |
| 4,687,805 | 8/1987 | White | 524/569 |
| 4,929,711 | 5/1990 | Chang et al. | 528/220 |
| 4,957,997 | 9/1990 | Chang et al. | 528/220 |

*Primary Examiner*—John Kight, III
*Assistant Examiner*—S. A. Acquah
*Attorney, Agent, or Firm*—Kenneth D. Tremain; Gerald A. Baracka

[57] ABSTRACT

Novel poly(keto-esters) having carbonyl and oxycarbonyl units randomly combined with linking units derived from olefinic monomers to form an essentially straight-chain polymer backbone are provided. The poly(keto-esters) are produced by converting a portion of the carbonyl functionality of a polyketone to oxycarbonyl groups. The conversion is achieved by reacting the polyketone with an organic peroxyacid in an inert liquid medium at a temperature from −20° C. to 150° C.

21 Claims, No Drawings

POLY(KETO-ESTERS)

CROSS-REFERENCE TO RELATED APPLICATION

This is a continuation-in-part of copending application Ser. No. 07/416,903, filed Oct. 4, 1989, now U.S. Pat. No. 4,929,711.

BACKGROUND OF THE INVENTION

1. Field of the Invention

The present invention relates to a new class of useful polymers which contain both carbonyl groups and oxycarbonyl groups in the polymer chain. More specifically, the poly(keto-esters) of the invention have carbonyl and oxycarbonyl units randomly combined in a straight-chain arrangement with linking units derived from olefinic monomers.

2. Description of Related Art

Polyketones, i.e., polymers having carbonyl groups incorporated in the polymer chain, are known. They are most commonly produced by polymerizing carbon monoxide with one or more α-olefins. Polyketones of this type derived from ethylene and carbon monoxide are disclosed by Brubaker in U.S. Pat. No. 2,495,286. Numerous other liquid and gas phase procedures utilizing Ziegler and radical catalysts have been described in the prior art for polymerizing carbon monoxide with ethylene and other olefinically unsaturated monomers. A general review of the properties, preparations, reactions and uses of olefin-carbon monoxide copolymers can be found in the Encyclopedia of Polymer Science and Technology, Vol. 9, p. 397–402, John Wiley & Sons, Inc.(1968).

Polyketones obtained by the copolymerization of carbon monoxide and functionalized vinyl monomers having pendant functional groups are also known. The copolymerization of carbon monoxide with vinyl halides, most commonly vinyl chloride, is reported by Wescott et al in Macromolecules 17, 2501 (1984), Kawai et al in J. Polym. Sci., A-1 10, 1709 (1972) Weintraub et al in Chem. Ind. 1976 (1965) and in U.S. Pat. No. 3,790,460; Kawai et al in J. Polym. Sci., Polym. Chem. Ed. 12, 1041 (1974) disclose the copolymerization of carbon monoxide with styrene and vinyl chloride Methyl methacrylate, acrylonitrile, vinyl chloride, vinylidene chloride and styrene have also been copolymerized with carbon monoxide using azobisisobutyronitrile catalyst by Otsuka et al in Die Makromolekulare Chemie 103, 291 (1967). Terpolymers of carbon monoxide, ethylene and vinyl acetate are disclosed in U.S. Pat. Nos. 4,172,939, 4,137,382 and 3,780,140. Additionally, in U.S. Pat. No. 3,780,140 the terpolymerization of ethylene and carbon monoxide with methyl methacrylate, vinyl propionate, methyl vinyl ether and isobutyl acrylate is described European Patent Application EP 281139A2 discloses terpolymers of ethylene, carbon monoxide and maleic anhydride.

Other methods are known for the preparation of polyketones and include, for example, copolymerization of ethylene with aliphatic aldehydes at high temperature and pressure; oxidation of polyvinylalcohol or polyethylene; cationic polymerization of ketene or diketene; radical ring-opening polymerization of unsaturated cyclic ethers or diketene; and radical ring-opening polymerization of 2,2-diphenyl-4-methylene-1,3-dioxolane.

Various procedures are known to chemically modify polyketones. U.S. Pat. No. 2,457,271 discloses a method for modifying monoolefin-carbon monoxide copolymers to increase the degree of unsaturation by heating the copolymer in a solution of an organic solvent with a minor amount of an alkali metal hydroxide. The copolymer is reacted until the oxygen content is decreased by at least 5% or the iodine number increased to at least 25. Modification of polyketones (monoolefin-carbon monoxide copolymers) by reaction with hydrazine hydrate and related nitrogen-containing compounds is described in U.S. Pat. No. 2,457,279. A process for reacting polyketones with hydrogen cyanide to prepare polycyanohydrin resins is disclosed in U.S. Pat. No. 2,495,284.

U.S. Pat. No. 2,495,292 discloses the catalytic hydrogenation of monoolefin-carbon monoxide polymers in the presence of a nickel catalyst to reduce the carbonyl groups to secondary alcohol groups and obtain high molecular weight polyhydric alcohols. U.S. Pat. No. 2,846,406 relates to a process for reacting monoolefin-carbon monoxide copolymers with formaldehyde and specific ammonium or amine salts to produce polyamines of relatively high molecular weight. Another process for modifying monoolefin-carbon monoxide copolymers by reaction with hydrazoic acid in the presence of an acid catalyst is disclosed in U.S. Pat. No. 3,068,201.

Processes for producing thermoplastic polymers from polyketones are also disclosed in U.S. Pat. Nos. 3,979,373 and 3,979,374. The products of U.S. Pat. No. 3,979,373 are polymeric furan derivatives obtained by reacting an equimolar alternate copolymer of ethylene and carbon monoxide with a strong acid, e.g. sulfuric, phosphoric, p-toluene sulfonic, etc., at 40°–200° C. The polymeric pyrrollic polymers of U.S. Pat. No. 3,979,374 are obtained by reacting an equimolar alternate copolymer of ethylene and carbon monoxide with a primary monoamine in the presence of strong acid and a solvent at a temperature from 40°–100° C.

U.S. Pat. Nos. 4,616,072 and 4,687,805 disclose halogenating ethylene-carbon monoxide copolymers by contacting said copolymers in a liquid medium and in the presence of an anionic halogenation catalyst selected from Lewis acids and Lewis bases.

The oxidation and chain cleavage of ethylene-carbon monoxide copolymers to produce mixtures of α, ω-dicarboxylic acids ranging from succinic acid through dodecanedioic acid and possibly higher and their corresponding esters is disclosed in U.S. Pat. No. 2,436,269. The oxidation is typically accomplished utilizing nitric acid and a vanadium oxidation catalyst, e.g. vanadium pentoxide or ammonium vanadate. Other oxidizing agents which are disclosed include the higher oxides of nitrogen, chromic acid, permanganates, molecular oxygen or air, or mixtures of these.

Poly(keto-esters) having ester groups pendant to the polymer chain are known and can be obtained by polymerizing carbon monoxide with alkyl acrylates or methacrylates as previously described. Optionally, other olefinic comonomers may be included in the polymerization. They can also be produced in accordance with the procedure of U.S. Pat. No. 2,557,256 by polymerizing carbon monoxide with a polymerizable olefinic compound containing ethylenic unsaturation and an alcohol or alkyl formate. Poly(keto-esters) having terminal ester groups are obtained by the palladium (II)-catalyzed copolymerization of carbon monoxide with ethylene in alcoholic solvents as disclosed by T. Lai et al in Organometallics, 3, 866-870(1984).

Poly(keto-esters) having keto and ester groups uniformly distributed throughout are also known. Such polymers can be produced by the ring-opening polymerization of unsaturated spiro ortho esters as disclosed by T. Endo et al in J. Polym. Sci: Polym. Chem. Ed., Vol 19, 1283 (1981). It is also known that numerous other poly(keto-esters) can be produced by the condensation polymerization of keto-dicarboxylic acids with diols. While the resulting condensation polymers will have both ester and keto groups in the polymer chain, the groups are necessarily fixed in relation to each other and uniformly located throughout the polymer backbone. Illustrative keto-containing diacids and diols which can be used include γ-ketopimelic acid, α-oxoglutaric acid, oxalacetic acid, ethylene glycol, butanediol and hexanediol

SUMMARY OF THE INVENTION

The novel poly(keto-esters) of the present invention are obtained by converting carbonyl groups present in a polyketone to oxycarbonyl groups so that the resulting polymer will have both carbonyl and oxycarbonyl groups randomly distributed throughout the polymer backbone. More specifically, the poly(keto-esters) are comprised of (a) carbonyl units, (b) oxycarbonyl units and (c) linking units derived from olefinic monomers, said linking units (a), (b) and (c) oriented in a random fashion to form an essentially straight-chain polymer backbone. Units (a) and (b) are present in a molar ratio of 0.01:1 to 100:1 and the sum of these units constitutes 0.1 to 50 mole percent of the polymer. The poly(keto-esters) have molecular weights greater than 1,000.

Olefinic monomers from which linking units (c) can be derived will correspond to the formula

where $R_1$, $R_2$, $R_3$, and $R_4$ are independently selected from the group consisting of hydrogen, alkyl, aryl or a functional group containing one or more oxygen, nitrogen, sulfur or halogen atoms. The above-defined poly(keto-esters) are obtained by contacting a polyketone of molecular weight greater than 1,000 and containing from 0.01 to 50 mole percent carbonyl with an organic peroxyacid oxidizing agent having from 1 to 20 carbon atoms in an inert liquid medium at a temperature from −20° C. to 150° C. The molar ratio of organic peroxyacid to carbonyl can range from 0.1:1 to 30:1 and the weight ratio of the inert liquid medium to polyketone can range from 1:1 to 100:1. Substantially all or only a portion of the carbonyl group present in the polyketone backbone can be converted to ester moieties.

Polyketones oxidized in accordance with the present procedure are typically obtained by polymerizing carbon monoxide with an ethylenically unsaturated monomer or mixture of one or more of these monomers. Useful monomers include $C_{2-12}$ α-olefins and vinyl or vinylidene monomers, generically referred to herein as functionalized comonomers, corresponding to the formula

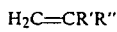

where R' represents the functional group and R" is hydrogen, alkyl, aryl, or a second functional group which can be the same or different than R'. Useful functional groups contain one or more oxygen, nitrogen, sulfur or halogen atoms or a combination thereof.

DETAILED DESCRIPTION OF THE INVENTION

The present invention broadly relates to a process for converting carbonyl groups present in a polymer chain of a polyketone to oxycarbonyl groups and to novel polymers produced thereby.

As employed herein the term polyketone generally refers to polymers having a plurality of carbonyl

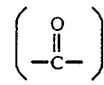

in the polymer chain. The carbonyl groups, also referred to herein as ketone or keto groups, may be randomly or uniformly distributed throughout the polymer chain.

The term polyester is used herein in a generic sense and encompasses any polymer having one or more oxycarbonyl

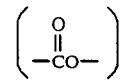

in the polymer chain. The polyesters will typically contain a plurality of oxycarbonyl groups, also referred to herein as ester groups. Since less than all of the available carbonyl functionality of the polyketone is generally converted to oxycarbonyl, the resulting polyesters contain both oxycarbonyl and carbonyl groups and these polyesters are referred to as poly(keto-esters).

As will be apparent to those skilled in the art, a broad array of useful poly(keto-esters) can be produced by the present process. It is a highly desirable aspect of the present invention that by judicious selection of the polyketone and the process variables, it is possible to vary the composition of the resulting product with respect to the amount of carbonyl and oxycarbonyl groups present therein. This makes it possible to "tailor" products to pre-determined specifications or for particular applications.

Considering the reaction of only a single carbonyl group within a polyketone derived from the copolymerization of ethylene and carbon monoxide, the process of the present invention can be represented as follows:

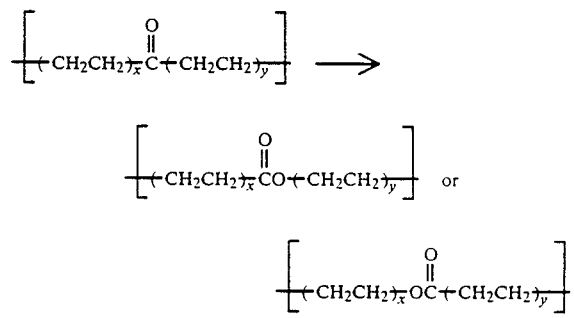

x and y are integers representing the number of comonomer units adjoining the particular CO site. It is evident from the above equation that insertion of the oxygen atom can occur on either side of the carbonyl group and different molecular species will result when x and y are different. It will also be obvious to those skilled in the art that an even greater number of possible molecular configurations are possible where a mixture of monomers, such as ethylene and vinyl acetate, is employed.

While it is possible to quantitatively convert all of the carbonyl to oxycarbonyl groups, more typically only a portion of the carbonyl of the polyketone will be reacted. Substantial amounts of carbonyl functionality may remain in the resulting polymer product. For example, where only a portion of the carbonyl groups in functionalized polyketone produced by the copolymerization of carbon monoxide with a functionalized comonomer is reacted, one of the many possible molecular configurations which could result at adjacent carbonyl sites can be represented as follows:

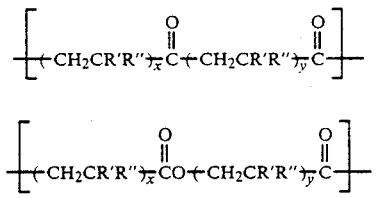

where R' and R" will be later defined and x and y are integers, which can be the same or different, representing the number of repeating functionalized comonomer units. It will be evident that the number of possible arrangements of the repeating units within the polymer precludes formularization of the resulting poly(ketoesters).

The polyketone polymers utilized for the preparation of the poly(keto-esters) in accordance with the process of the present invention have a hydrocarbon polymer chain backbone containing a plurality of carbonyl groups distributed throughout with the carbon atom of the carbonyl group being part of the polymer chain backbone. The polymer chain backbone is comprised substantially entirely of carbon atoms. The carbonyl groups may be either randomly or uniformly distributed within the polymer molecule, i.e., along the polymer backbone. The polyketones can structurally be represented as being comprised of repeating units of the structural formula

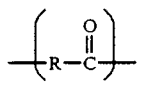

where R represents a bivalent moiety derived from an olefinic monomer or mixture of monomers.

The molecular weight of the polyketones can range from about 1,000 up to several million or more. It is possible to react extremely high molecular weight polyketones (up to about 5 million) in accordance with the process to convert all or a portion of the carbonyl groups to ester moieties. Most commonly, the polyketones will have molecular weights from 1,000 to 2,000,000 and, more particularly, from about 10,000 up to about 1,000,000. The carbonyl content, expressed in mole percent, of the polyketones will range from 0.01 up to about 50. Most usually the carbonyl content will range from 0.5 mole percent up to about 20 mole percent.

Useful polyketones can be obtained by any of the known procedures described in the art. The method by which the polyketones are prepared is of no consequence so long as the polyketone is substantially free of impurities, such as catalyst residues or the like, which might interfere with the oxidation of the carbonyl to oxycarbonyl. While the polyketones are most advantageously prepared by copolymerization, other procedures can be utilized. These can include, for example, copolymerization of ethylene with aliphatic aldehydes at high temperature and pressure; oxidation of polyvinylalcohol or polyethylene; cationic polymerization of ketenes or diketenes; radical ring-opening polymerization of unsaturated cyclic ethers or diketenes; radical ring-opening polymerization of 2,2-diphenyl-4-methylene-1,3-dioxolane, and the like.

Copolymerization of carbon monoxide and α-olefins or mixtures of α-olefins is commonly utilized to produce the polyketones. Numerous procedures for preparation of these polymers are known and described in the prior art. The α-olefins which are used typically have from 2 to 12 carbon atoms and include aliphatic α-olefins, such as ethylene, propylene, butene-1, isobutylene, hexene-1, octene-1, and α-olefins having aromatic substituents, such as styrene, p-methyl styrene, α-methyl styrene and the like. Polyketones obtained by the polymerization of carbon monoxide and ethylene or the polymerization of carbon monoxide, ethylene and a second α-olefin having from 3 to 8 carbon atoms, particularly propylene, are advantageously utilized. One or more other olefinically unsaturated monomers such as styrene; α-methylstyrene; acrylonitrile; acrylamide; vinyl chloride; vinylidene chloride; vinyl acetate; methyl vinyl ketone; vinylpyridine; acrylic acid and esters thereof; methacrylic acid and esters thereof; maleic anhydride and mono- and diesters thereof; and the like may be included in the polymerization with the carbon monoxide and α-olefin.

Polyketones having functional groups pendant to the polymer backbone can similarly be obtained by copolymerizing carbon monoxide with the functionalized comonomer. Useful functionalized comonomers for this purpose include vinyl and vinylidine monomers corresponding to the general formula

$H_2C=CR'R''$ where R' represents a functional group containing one or more oxygen, nitrogen, sulfur or halogen atoms or a combination of two or more of these atoms, and R" is hydrogen, alkyl, aryl, or a functional group as defined for R'. The functional groups R' and R" can be a single atom, as in the case of halogen, or a substituted aliphatic or aromatic or heterocyclic moiety. When the functional group is a single halogen atom, it is most commonly chlorine. When both R' and R" are functional groups, they can be the same or different.

Representative functional groups include alkoxy; aryloxy; acyl; acyloxy; carboxy and derivatives thereof including salts, esters and amides; nitrile; amine; halo; thioalkyl; pyridyl; pyrroyl; furfuryl; furoyl; thiazoyl; thienyl; and the like. Monomers which can be copolymerized with carbon monoxide to introduce functional groups of the above types include vinyl acetate; vinylacetonitrile; vinyl n-butyl ether; vinyl butyrate; vinyl chloride; vinylidene chloride; acrylonitrile;

methyl vinyl ketone; methyl vinyl ether; vinyl isobutyl ether; vinyl pyridine; N-vinylcarbazole; vinyl 2-chloroethyl ether; vinyl 2-ethylhexanoate; vinyl 2-ethylhexyl ether; maleic anhydride, vinyl fluoride, acrylic acid; methacrylic acid; ethyl acrylate; methyl methacrylate; and the like. It should be noted that when the functional group is ketonic, as with methyl vinyl ketone, in addition to oxidizing carbonyl groups present in the polymer chain, all or a portion of the carbonyls of the pendant keto groups will also be oxidized to oxycarbonyl groups.

Particularly useful functionalized comonomers are selected from the group consisting of acrylic acid, $C_{1-4}$ alkyl esters of acrylic acid, methacrylic acid, $C_{1-4}$ alkyl esters of methacrylic acid and vinyl $C_{1-4}$-alkanoates. It is even more advantageous if the functionalized comonomer is vinyl acetate, vinyl butyrate, or iso-butyl acrylate.

The functionalized comonomer may be the sole comonomer employed with the carbon monoxide or it may be advantageously polymerized with the carbon monoxide in a mixture of comonomers wherein the mixture is comprised of a functionalized comonomer and an alpha-olefin of the type described above, i.e. $C_{2-12}$ $\alpha$-olefin. Terpolymers are produced in this manner. Particularly useful polyketone terpolymers containing pendant functional groups are obtained by copolymerizing carbon monoxide with ethylene and a functionalized comonomer selected from the group consisting of acrylic acid, $C_{1-4}$ alkyl esters of acrylic acid, methacrylic acid, $C_{1-4}$ alkyl esters of methacrylic acid and vinyl $C_{1-4}$-alkanoates. When utilizing a terpolymer the amount of carbon monoxide polymerized will be the same as previously described and the balance will be comprised of the functionalized comonomer and the $\alpha$-olefin present in a molar ratio from 50:1 to 1:50 and, more preferably, 10:1 to 1:10.

Polyketones which can be oxidized in accordance with the present invention and obtained by polymerizing carbon monoxide with functionalized comonomers, alone or in combination with $\alpha$-olefins, are known and some of these polymers are commercially available. For example, terpolymers of ethylene, carbon monoxide and vinyl acetate are available under the trademark ELVALOY. Copolymers of carbon monoxide and vinyl halides, such as vinyl chloride, can be obtained by the polymerization procedures described in U.S. Pat. No. 3,790,460 and by Wescott, et al Macromolecules 17, 2501 (1984), Kawai et al J. Polym. Sci., A-1 10, 1709 (1972), Weintraub et al Chem. Ind. 1976 (1965). Copolymers of carbon monoxide with styrene or vinyl chloride can be produced in accordance with the procedures of Kawai et al J. Polym. Sci., Polym. Chem. Ed. 12, 1041 (1974). Carbon monoxide can also be copolymerized with methyl methacrylate, acrylonitrile, vinyl chloride, vinylidene chloride or styrene using azobisisobutyronitrile catalyst as described by Otsuka et al in Die Makromolekulare Chemie 103, 291 (1967). The procedures of U.S. Pat. Nos. 4,172,939, 4,137,382 and 3,780,140 can be employed to produce terpolymers of carbon monoxide, ethylene and vinyl acetate and terpolymers of carbon monoxide and ethylene with methyl methacrylate, vinyl propionate, methyl vinyl ether or isobutyl acrylate can be obtained in accordance with the procedure of U.S. Pat. No. 3,780,140.

Physical characteristics of the resulting poly(ketoesters) are a function of molecular weight and the molecular weight distribution of the polyketone employed and the extent of conversion of carbonyl groups to oxycarbonyl groups. The latter primarily depend on the composition of the polyketone, reaction conditions, and amount of oxidizing agent used.

The reaction is carried out in an inert liquid medium, that is, a material which is a liquid at the reaction temperature and which does not react with either the polyketone or the resulting product and which is not oxidized under the reaction conditions. Additionally, the liquid must be one which is capable of either dissolving or swelling the polymer. While the boiling point of the liquid medium is not critical, the boiling point should not be so high as to make removal of the solvent difficult. The reaction can be run under reflux conditions or in a pressure vessel.

Useful mediums for the reaction include hydrocarbons, chlorinated hydrocarbons, nitrohydrocarbons, carboxylic acids and carboxylic acid esters. Hexane, heptane, octane, benzene, decalin, methylene chloride, chlorobenzene, dichlorobenzene, nitrobenzene and dimethylphthalate are illustrative of the compounds which can be used as the reaction medium for the process. Aliphatic ($C_{5-10}$) hydrocarbons, benzene, chlorinated $C_{1-3}$ aliphatic hydrocarbons, chlorobenzene and dichlorobenzene are particularly advantageous for the process.

The weight ratio of the liquid medium to polyketone can vary over broad limits and generally ranges from 1:1 to 100:1.

More preferably the weight ratio of liquid to polyketone will range from 5:1 up to about 50:1.

An oxidizing agent is necessarily utilized to convert the keto groups to ester moieties. The oxidizing agent is dispersed or dissolved in the inert liquid medium and contacted with the polyketone. The molar ratio of oxidizing agent to carbonyl group ranges from about 0.1:1 to 30:1 and, most preferably, from 2:1 to 15:1. Organic peroxyacids are employed as the oxidizing agent for the present process. Useful organic peroxyacids for the invention contain from 2 up to about 30 carbon atoms and correspond to the formula

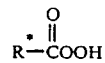

where R* is an aliphatic, cycloaliphatic or aromatic moiety which can be unsubstituted or substituted with one or more halo, nitro or carboxyl groups. When R* is aliphatic, i.e., an alkyl group, it will generally contain from 1 to 19 carbon atoms. When R* is cycloaliphatic, i.e., a cycloalkyl group, it will generally contain from 5 to 19 carbon atoms. When R* is aromatic, i.e., an aryl group, it will generally contain from 6 to 19 carbon atoms.

As previously indicated, any of said alkyl, cycloalkyl or aryl groups can contain halo-, nitro- or carboxyl-substituents. Chloro and fluoro groups are particularly advantageous halo substituents. In a particularly useful embodiment, the organic peroxyacid oxidizing agent is a chloro-, fluoro- or carboxyl-substituted aromatic or aliphatic peroxyacid. Peroxybenzoic acid, m-chloroperoxybenzoic acid, peroxyacetic acid, trifluoroperoxyacetic acid, monoperoxyphthalic acid and monoperoxymaleic acid are representative of the oxidizing agents which can be used. m-Chloroperoxybenzoic acid and monoperoxymaleic acid have been found to be particularly advantageous. The peroxyacid can be used as such, or formed in situ, e.g., by the reaction of maleic anhydride with hydrogen peroxide.

The reaction of the polyketone with the oxidizing agent can be conducted at temperatures from about −20° C. up to about 150° C.; however, it is generally considered most advantageous to carry out the reaction at a temperature from about 20° C. to 100° C. While the reaction time will vary depending on the reactants and liquid medium used and the reaction temperature, it can range from 30 minutes under optimal or near optimal conditions up to 24 hours or more where low reaction temperatures and/or low concentrations of reactants are used.

Reaction conditions and time of reaction will be selected based on the degree of conversion of carbonyl to oxycarbonyl desired. While all or substantially all of the available carbonyl groups of the polyketone can be converted to ester moieties it has been advantageous to convert only a portion of the carbonyl in order to produce poly(keto-esters), i.e., polymer products which contain both oxycarbonyl and carbonyl moieties. The process is generally conducted in such a way that only a portion of the keto functionality is converted to ester groups. This permits the use of reaction times and conditions which minimize or completely eliminate undesirable chain scission reactions. Most commonly the reaction is carried to no more than 90% conversion of the keto groups. In an especially useful embodiment, 20 to 80% of the carbonyl groups are converted to oxycarbonyl.

The polymer products prepared in accordance with the invention are recovered utilizing conventional procedures known to the art. Generally, the polymer solution or polymer dispersion is cooled to ambient conditions to precipitate the polymer which is then recovered by filtration. To facilitate this precipitation, precipitating diluents which are non-solvents for the polyester, i.e. do not dissolve or swell the polymer, can be added. Such precipitating diluents include but are not limited to methanol, ethanol, propanol, t-butanol, acetone and the like. Since excess oxidizing agent and by-products formed as a result of the reaction, e.g. carboxylic acids, may be precipitated with the polyester it may be advantageous to re-dissolve the polymer in a solvent, such as toluene or xylene, and re-precipitate by the addition of one or more of the aforementioned precipitating diluents. The recovered polymer is then dried and, if desired, additives incorporated therein.

Polyketones, particularly ethylene-carbon monoxide copolymers, are known to exhibit photodegradability due to absorption of radiation by the carbonyl chromophore (Comprehensive Polymer Science, Vol 6, p. 530, Pergamon Press). However, when the polyketones are converted to polyester products in accordance with the process of this invention by converting a portion of the carbonyl groups in the polymer chain to oxycarbonyl moieties, the resulting poly(keto-esters) can also be degraded by biological means, i.e., by the action of living organisms.

In view of today's increased concern about disposal of plastic waste there is an increasing call for environmentally degradable polymeric materials and the combination of photo and biodegradability in a polymeric material is an extremely desirable characteristic. It is well-established that the substrate polyketones of this invention, particularly ethylene-carbon monoxide copolymers are photodegradable, due to the absorption of radiation by the carbonyl chromophore [Comprehensive Polymer Science, Vol. 6, p530, Pergamon Press]. The conversion of polyketone carbonyl groups to oxycarbonyl groups can confer biodegradability on the polymer. As conversion increases, biodegradability increases. It is an added advantage that such poly(ketoesters) produced are intrinsically biodegradable. That is, they do not require the addition of biodegradable additives, such as starch.

The poly(keto-esters) of the present invention which exhibit the aforementioned desirable characteristics are comprised of carbonyl units, oxycarbonyl units, and linking units derived from olefinic monomers. The units derived from olefinic monomers correspond to the formula

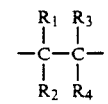

where $R_1$, $R_2$, $R_3$ and $R_4$ are independently selected from the group consisting of hydrogen, alkyl, aryl or a functional group containing one or more oxygen, nitrogen, sulfur or halogen atoms. The units are linearly arranged in a random manner to comprise the polymer backbone.

Randomness of the repeating units is a result of the oxidation process and the polyketones from which the poly(keto-esters) are derived. Since only a portion of the carbonyl groups are oxidized and the oxidation occurs in a more or less random fashion, non-uniform distribution of the repeating units within the poly(ketoester) is insured. Furthermore, the carbonyl moieties being oxidized are randomly distributed in all but the situation where the polyketone is obtained by copolymerizing equimolar amounts of carbon monoxide and one other monomer. This random distribution of repeating carbonyl and oxycarbonyl units distinguishes the present poly(keto-esters) from heretofore known polyesters containing keto groups obtained by other processes where the carbonyl and oxycarbonyl groups in the polymer chain are fixed in relation to each other and uniformly located throughout the polymer backbone.

The present poly(keto-esters) have molecular weights greater than 1,000. More typically, molecular weights range from 10,000 to 1,000,000. The molecular weight of the poly(keto-ester) may be essentially the same or different than the molecular weight of the starting polyketone. Since some chain scission generally occurs as a result of the oxidation, the molecular weight of the poly(keto-ester) is usually somewhat lower than that of the starting polyketone. Where the molecular weight of a polyketone is undesirably high, it is possible to produce poly(keto-esters) with molecular weights in a more useful range by controlling reaction conditions.

The mole percentages of the carbonyl and oxycarbonyl groups, taken as a whole, will range from 0.1 up to 50 mole percent. Typically, the sum of the mole percentages of these two groups in the poly(keto-ester) is essentially the same as the mole percent of carbonyl in the starting polyketone but some minor variation may occur. Most generally the mole percent of carbonyl/oxycarbonyl in the poly(keto-ester) ranges from about 0.5 to about 20. The molar ratio of carbonyl to oxycarbonyl can be widely varied but usually ranges from about 0.01:1 to 100:1. Most commonly the molar ratio of carbonyl to oxycarbonyl is from 0.1 to 10.

The environmentally degradable poly(keto-esters) obtained in accordance with the present process are useful as plastics and waxes. The products are also useful as adhesives and coatings. They can be substituted for conventional materials having comparable physical properties in known applications.

The following examples illustrate the invention more fully; however, they are not intended as a limitation on the scope thereof. In the examples, all parts, percentages and ratios are on a weight basis unless otherwise indicated.

EXAMPLE I

A poly(keto-ester) was prepared by oxidizing an ethylene-carbon monoxide (ECO) copolymer resin powder containing 1.6% carbon monoxide (Mw 125,000; Mn 18,000). For the oxidation 10 grams ECO bonded by sandwiching a 1" square area of adhesive between two 1"×4" pieces of the paper. A shear force of 500 grams was applied and the temperature raised from 50° C. in 5° C. increments every 15 minutes. Shear adhesion failure (average of 5 tests) for the poly(keto-ester) did not occur until 116° C.

EXAMPLES III-VIII

To demonstrate the ability to vary the process and the degree of conversion of carbonyl (—CO—) to oxycarbonyl (—COO—), a series of reactions were conducted following the general procedure of Example I. Details for these reactions and for the resulting poly(keto-ester) products are set forth in Table I. It is apparent from the data that a variety of solvents and conditions can be utilized for the oxidation reaction and that a wide variety of polyester products can be produced.

TABLE I

| Example | Molar Ratio MCPBA:CO | Reaction Diluent (Diluent:ECO) | Reaction Temp (°C.) | Reaction Time (hours) | Carbonyl Conversion (%) | Poly(keto-ester) Molar Ratio CO:COO |
|---|---|---|---|---|---|---|
| III | 13.4:1 | Chlorobenzene (11.1:1) | 70 | 20 | 80 | 0.25:1 |
| IV | 6.8:1 | Toluene (8.7:1) | 50 | 24 | 20 | 4.0:1 |
| V | 6.8:1 | Ethyl Acetate (9.0:1) | 70 | 24 | 15 | 5.7:1 |
| VI | 6.8:1 | Decalin (9.0:1) | 50 | 24 | 20 | 4.0:1 |
| VII | 6.8:1 | Dimethylphthalate (11.9:1) | 70 | 24 | 50 | 1.0:1 |
| VIII | 6.8:1 | Heptane (6.8:1) | 70 | 24 | 90 | 0.11:1 | and 2.0 grams m-chloroperoxybenzoic acid (MCPBA) were charged to a flask containing 50 mls heptane and dissolved therein. The ratio of heptane to polyketone was 3.4:1 and the molar ratio of the oxidizing agent to carbonyl (CO) was 2.1:1. The reaction mixture was stirred for 2 hours at 80° C. and then cooled to room temperature. Methanol (250 mls) was added to precipitate the polymer. The resulting poly(keto-ester) product was recovered by filtration, washed with methanol and dried at room temperature under vacuum. Analysis of the product by infrared spectroscopy showed a significant decrease in the ketone carbonyl absorption (1710 cm$^{-1}$) compared to the starting ECO copolymer and a strong absorption at 1735 cm$^{-1}$ attributable to the presence of ester carbonyl. Based on the relative heights of the infrared absorption peaks, the molar ratio of carbonyl to oxycarbonyl was estimated to be 0.11:1. The molar ratio was shown by nuclear magnetic resonance spectroscopy to be 0.22:1. Gel permeation chromatographic data showed Mw=66,600 and Mn=18,000.

EXAMPLE II

The procedure of Example I was repeated on a larger scale. Reactants used were the same except that the ratio of heptane to ECO copolymer was 2.4:1 and the molar ratio of m-chloroperoxybenzoic acid to carbonyl was 2.0:1. After 2 hours reaction at 80° C. approximately 80% of the carbonyl groups of the polyketone were converted to oxycarbonyl groups. The resulting poly(keto-ester) contained carbonyl and oxycarbonyl groups which were present in a molar ratio of 0.25:1.

The poly(keto-ester) had a tensile strength at yield of 1650 psi and elongation of 540% and was useful for the preparation of sheet, film and molded articles. The product was also useful as a hot melt adhesive. To demonstrate the adhesive ability, Kraft paper was hot-melt

EXAMPLE IX

A low molecular weight polyketone was oxidized using monoperoxymaleic acid. The monoperoxymaleic acid was prepared by reacting (1 hour at 40° C. with stirring) 26 mls 30% aqueous hydrogen peroxide with 56.0 grams maleic anhydride in 125 mls methylene chloride. The solid maleic acid formed was collected on a filter and the filtrate containing monoperoxymaleic acid was added to a chlorobenzene solution of the polyketone obtained by dissolving 5.0 grams ethylene-carbon monoxide copolymer [powder; 36.6 wt. % (36.6 mole %) carbon monoxide; Mw 3,700; Mn 1,970]in 100 mls chlorobenzene. After stirring for 24 hours at 70° C., the mixture was cooled and filtered and 500 mls methanol added to the filtrate to precipitate the polymer. After washing with methanol, the polyester was dissolved in toluene and re-precipitated using methanol. Conversion of keto functionality to ester functionality was calculated to be 20% based on a comparison of the relative intensities of the infrared absorption peaks. The poly(keto-ester) contained CO and COO present in a molar ratio of 4:1.

EXAMPLES X-XIII

A series of low molecular weight ethylene-carbon monoxide (ECO) copolymers of varying carbonyl content were oxidized to the corresponding polyesters in accordance with the general procedure of the invention. In each instance 90% of the carbonyl functionality was converted to oxycarbonyl groups. The oxidizing agent used was m-chloroperoxybenzoic acid (MCPBA) acid and the diluent was chlorobenzene. Characteristics of the ECO copolymers and particulars for the reaction and the resulting poly(keto-ester) product are set forth in Table II.

TABLE II

| | ECO | | | Molar Ratio | Diluent: | Rn. Temp | Rn. Time | Poly(keto-ester) | | | |
|---|---|---|---|---|---|---|---|---|---|---|---|
| | | | | | | | | | | Mole % | Molar Ratio |
| Ex. | Mw | Mn | % CO | MCPBA:CO | ECO | (°C.) | (hrs.) | Mw | Mn | CO + COO* | CO:COO |
| X | 2,510 | 1,240 | 13.0 | 2.1:1 | 11.1:1 | 70 | 24 | 2,000 | 1,000 | — | 0.1:1 |
| XI | 2,300 | 1,260 | 3.2 | 4.4:1 | 11.1:1 | 70 | 24 | 2,100 | 1,200 | 3.0 | 0.1:1 |
| XII | 2,190 | 1,040 | 5.9 | 2.7:1 | 7.9:1 | 70 | 16 | 1,900 | 1,000 | — | 0.1:1 |
| XIII | 2,270 | 1,130 | 10.0 | 2.5:1 | 13.1:1 | 70 | 20 | 2,000 | 1,100 | 9.6 | 0.1:1 |

*Mole % was determined by nuclear magnetic resonance spectroscopy

EXAMPLE XIV

Ethylene-carbon monoxide copolymer pellets [1.6 wt. % (1.6 mole %) carbon monoxide; Mw 125,000; Mn 18,000] were suspended in 10 mls chlorobenzene with 1.6 grams m-chloroperoxybenzoic acid in a glass vessel. The molar ratio of oxidizing agent to carbonyl was 8.3:1 and the ratio of solvent to copolymer resin was 5.9:1. The container was sealed and rolled for 90 hours on a roller mill under ambient conditions. The swelled polymer pellets (recovered by filtration) were washed with toluene then methanol and purified by dissolving in toluene followed by precipitation with methanol Infrared analysis of the dried polymer product showed a strong ester carbonyl absorption at 1735 cm$^{-1}$. Based on the relative intensities of the keto and ester peaks the conversion of ketone to ester functionality was estimated to be 35%. The poly(keto-ester) contained carbonyl and oxycarbonyl present at a molar ratio of 1.9:1.

EXAMPLE XV

Ethylene-carbon monoxide copolymer powder [1.6 wt. % (1.6 mole %) carbon monoxide; Mw 125,000; Mn 18,000] was combined with chlorobenzene (weight ratio 7.7:1) and m-chloroperoxybenzoic acid (molar ratio 8.8:1) and stirred for 7 days at room temperature. Approximately fifty percent of the ketone groups of the polyketone converted to ester groups. Expressed in different terms, the resulting poly(keto-ester) product had carbonyl and oxycarboxyl groups, present in essentially a 1:1 molar ratio, randomly distributed throughout the polymer chain.

EXAMPLE XVI

One gram of the polyketone of Example XV was dissolved in 25 mls chlorobenzene by heating at 90° C. The solution was cooled to 65° C. and 3.0 grams maleic anhydride and 2.0 grams 30% aqueous hydrogen peroxide added thereto. The reaction mixture was maintained at 65° C. for 21 hours with stirring after which time the polymer was precipitated by cooling the mixture and the addition of 50 mls. methanol. The recovered polymer was dissolved in 50 mls toluene and reprecipitated using methanol. The infrared spectrum of the dried polymer showed the presence of an ester peak at 1735 cm$^{-1}$. Conversion of carbonyl to oxycarbonyl was estimated by infrared spectroscopic analysis to be 20% producing a molar ratio of CO:COO in the resulting poly(keto-ester) of 4:1.

EXAMPLE XVII

To further demonstrate the versatility of the invention and the ability to produce poly(keto-esters) by oxidizing polyketones containing functional groups, a commercially available ethylene-vinyl acetate-carbon monoxide terpolymer sold under the trademark EL-VALOY was reacted in accordance with the general procedures. The terpolymer contained 9.5 mole % vinyl acetate and 12.1 mole % carbon monoxide by analysis. For the reaction, 1.0 gram of the terpolymer was dissolved in 15 mls chlorobenzene at 90° C. The solution was then cooled to 65° C. and 3.0 grams m-chloroperoxybenzoic acid (55% purity) added thereto. The mixture was stirred at 65° C. for 20 hours after which time the solution was cooled to room temperature and 100 mls methanol added to precipitate the polymer product. The polymer was recovered by filtration, reprecipitated from toluene and dried at room temperature. Analysis of the recovered product by nuclear magnetic resonance spectroscopy indicated that 99% conversion of carbonyl to oxycarbonyl was achieved. The poly(keto-ester) contained 12.1 mole percent CO+COO present at a molar ratio of 99:1.

EXAMPLE XVIII

To demonstrate the degradability of the poly(keto-esters) prepared in accordance with the process of this invention by living organisms, the products of Examples X, XI, XII, and XIII were tested following the procedure outlined in ASTM G-21-70, "Determining Resistance of Synthetic Polymeric Materials to Fungi." For comparison, the polyketones used to obtain products X, XI, XII and XIII were also evaluated. For the test, approximately one gram of polymer film coated on a fiberglass tape was placed on a mineral salts agar medium and sprayed with a combined suspension of spores of *Aspergillus Niger, Penicillium Funiculosum, Chaetomium Globosum, Gliocladium Virens* and *Aureobasidium Pullulans*. After inoculation, the samples and placed in an incubator maintained at 30±1° C. and relative humidity greater than 85%. After 60 days, the samples were removed and the weight loss recorded. Results were as follows:

| | Percent Weight Loss |
|---|---|
| Ex. X Poly(keto-ester) | 23 |
| Ex. XI Poly(keto-ester) | 4 |
| Ex. XII Poly(keto-ester) | 3 |
| Ex. XIII Poly(keto-ester) | 18 |
| Polyketone used for Ex. X | <1 |
| Polyketone used for Ex. XI | <1 |
| Polyketone used for Ex. XII | <1 |
| Polyketone used for Ex. XIII | <1 |

It is apparent from the above data that polyketones which are essentially inert to the action of living organisms can be rendered biodegradable by converting a portion of the carbonyl moieties to ester groups. The above examples further illustrate that biodegradability is enhanced as the oxycarbonyl content is increased. This can be accomplished by utilizing polyketones having higher levels of copolymerized carbon monoxide and/or by converting more of the carbonyl functionality to oxycarbonyl groups.

We claim:

1. A poly(keto-ester) having a molecular weight greater than 1000 and comprised of:
   (a) carbonyl units;
   (b) oxycarbonyl units; and
   (c) linking units derived from olefinic monomers and corresponding to the formula

wherein $R_1$, $R_2$, $R_3$, and $R_4$ are selected from the group consisting of hydrogen, alkyl, aryl or a functional group containing one or more oxygen, nitrogen, sulfur or halogen atoms; said units randomly arranged to form an essentially straight-chain polymer backbone with (a) and (b) constituting from 0.1 to 50 mole percent of the polymer and the molar ratio of (a) to (b) ranging from 0.01:1 to 100:1.

2. The poly(keto-ester) of claim 1 having a molecular weight from about 10,000 to 1,000,000 and containing at least 2 mole percent oxycarbonyl.

3. The poly(keto-ester) of claim 2 wherein (a) and (b) constitute from about 0.5 to 20 mole percent of the polymer and the molar ratio of (a) to (b) ranges from 0.1 to 10.

4. The poly(keto-ester) of claim 3 wherein (c) is derived from an α-olefin or mixture of α-olefins containing from 2 to 12 carbon atoms.

5. The poly(keto-ester) of claim 4 wherein the α-olefin is ethylene or a mixture of ethylene and an α-olefin having from 3 to 8 carbon atoms.

6. The poly(keto-ester) of claim 3 wherein (c) is derived from a functionalized vinyl or vinylidene monomer of the formula

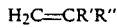

where R' represents a functional group containing one or more oxygen, nitrogen, sulfur or halogen atoms or a combination of two or more of these atoms, and R" is hydrogen, alkyl, aryl or a functionalized group as defined for R'.

7. The poly(keto-ester) of claim 6 wherein the functionalized monomer is selected from the group consisting of acrylic acid, $C_{1-4}$ alkyl esters of acrylic acid, methacrylic acid, $C_{1-4}$ alkyl esters of methacrylic acid and vinyl $C_{1-4}$-alkanoates.

8. The poly(keto-ester) of claim 7 wherein the functionalized monomer is vinyl acetate, vinyl butyrate, or iso-butyl acrylate.

9. The poly(keto-ester) of claim 3 wherein (c) is derived from a mixture of $C_{2-12}$ α-olefin and a functionalized vinyl or vinylidene monomer of the formula

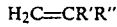

where R' represents a functional group containing one or more oxygen, nitrogen, sulfur or halogen atoms or a combination of two or more of these atoms, and R" is hydrogen, alkyl, aryl or a functionalized group as defined for R'.

10. The poly(keto-ester) of claim 9 wherein the α-olefin is ethylene and the functionalized monomer is selected from the group consisting of acrylic acid, $C_{1-4}$ alkyl esters of acrylic acid, methacrylic acid, $C_{1-4}$ alkyl esters of methacrylic acid and vinyl $C_{1-4}$-alkanoates.

11. The poly(keto-ester) of claim 10 wherein the functionalized monomer is vinyl acetate, vinyl butyrate, or iso-butyl acrylate.

12. The poly(keto-ester) of claim 1 obtained by oxidizing a portion of the carbonyl groups of a polyketone to oxycarbonyl groups utilizing an organic peroxyacid.

13. The poly(keto-ester) of claim 12 derived from a polyketone having a molecular weight greater than 1,000 and a carbonyl content from 0.01 to 50 mole percent which is contacted with an organic peroxyacid oxidizing agent having from 2 to 30 carbon atoms in a inert liquid medium at a temperature from −20° C. to 150° C.; the molar ratio of said oxidizing agent to carbonyl ranging from 0.1:1 to 30:1 and the weight ratio of said inert liquid medium to said polyketone ranging from 1:1 to 100:1.

14. The poly(keto-ester) of claim 13 derived from a polyketone having a molecular weight from about 10,000 to about 1,000,000 and wherein from about 10% to 90% of the carbonyl groups are oxidized to oxycarbonyl.

15. The poly(keto-ester) of claim 14 obtained using an organic peroxyacid selected from the group consisting of aliphatic, cycloaliphatic or aromatic peroxyacids and halo-, nitro-, and carboxyl- substituted aliphatic, cycloaliphatic, or aromatic peroxyacids; an inert liquid medium selected from the group consisting of hydrocarbons, chlorinated hydrocarbons, nitrohydrocarbon, carboxylic acids and esters of carboxylic acids; weight ratio of the inert liquid medium to polyketone from 5:1 to 50:1; molar ratio of peroxyacid to carbonyl from 2:1 to 15:1; and reaction temperature from 20° C. to 100° C.

16. The poly(keto-ester of claim 15 obtained using peroxymaleic acid as the oxidizing agent.

17. The poly(keto-ester) of claim 15 derived from a polyketone containing from 0.5 to 20 weight percent carbonyl and obtained by copolymerizing of carbon monoxide with ethylene or a mixture of ethylene and a $C_{3-8}$ α-olefin.

18. The poly(keto-ester) of claim 15 derived from a polyketone containing from 0.5 to 20 weight percent carbonyl and obtained by copolymerizing carbon monoxide with a functionalized vinyl or vinylidene monomer of the formula

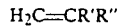

where R' represents a functional group containing one or more oxygen, nitrogen, sulfur or halogen atoms or a combination of two or more of these atoms, and R" is hydrogen, alkyl, aryl or a functionalized group as defined for R'.

19. The poly(keto-ester) of claim 18 derived from a copolymer of carbon monoxide and vinyl acetate.

20. The poly(keto-ester) of claim 15 derived from a polyketone containing from 0.5 to 20 weight percent carbonyl and obtained by copolymerizing of carbon monoxide with a mixture of $C_{2-12}$ α-olefin and a functionalized vinyl or vinylidene monomer of the formula

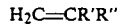

where R' represents a functional group containing one or more oxygen, nitrogen, sulfur or halogen atoms or a combination of two or more of these atoms, and R" is hydrogen, alkyl, aryl or a functionalized group as defined for R'.

21. The poly(keto-ester) of claim 20 derived from a copolymer of carbon monoxide, ethylene and vinyl acetate.

* * * * *